Aug. 25, 1925. 1,550,835

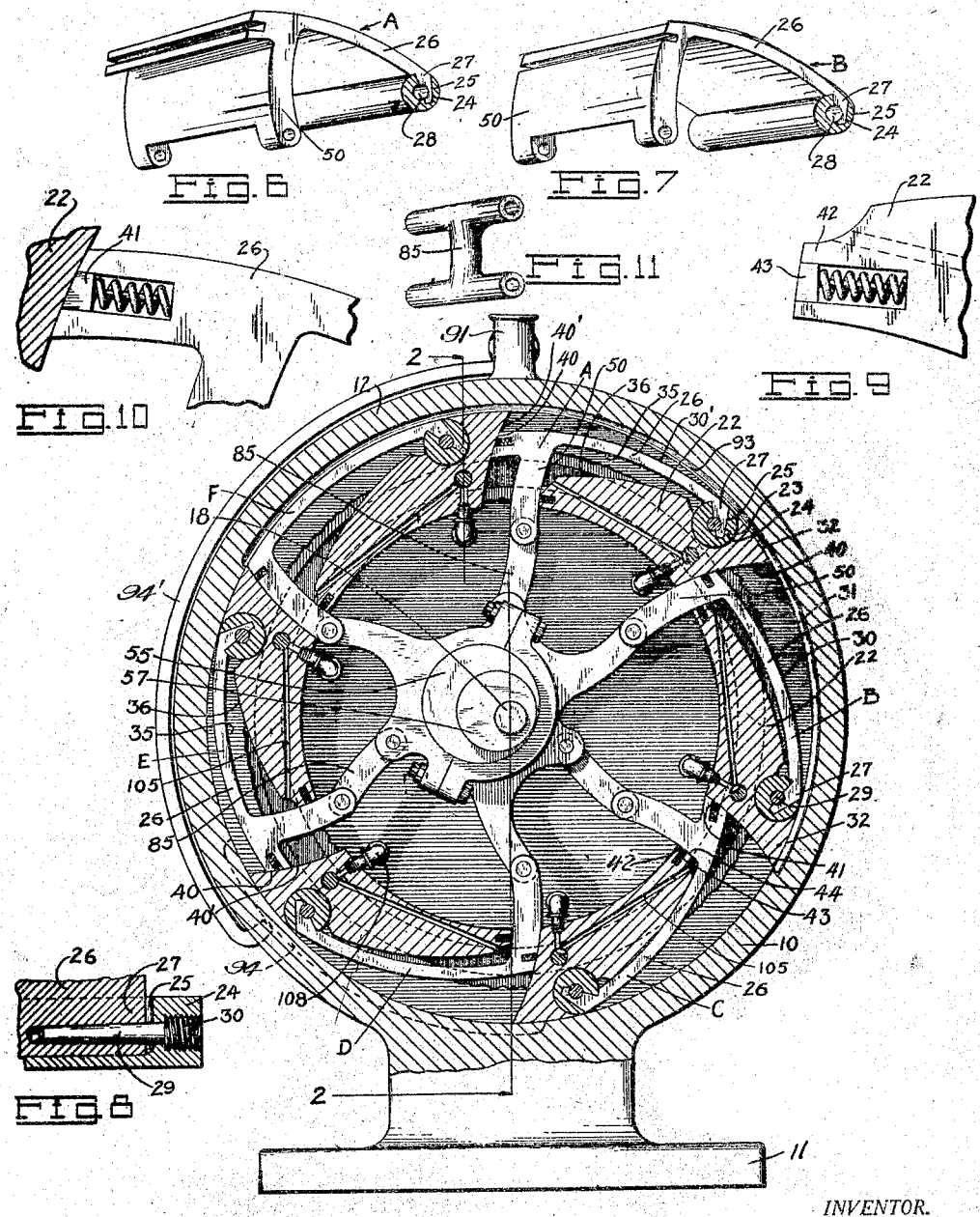

J. A. MORGAN

ROTARY ENGINE

Filed Oct. 11, 1923 4 Sheets-Sheet 2

INVENTOR.
JOHN A. MORGAN
BY
ATTORNEY.

Aug. 25, 1925.   1,550,835
J. A. MORGAN
ROTARY ENGINE
Filed Oct. 11, 1923   4 Sheets-Sheet 3
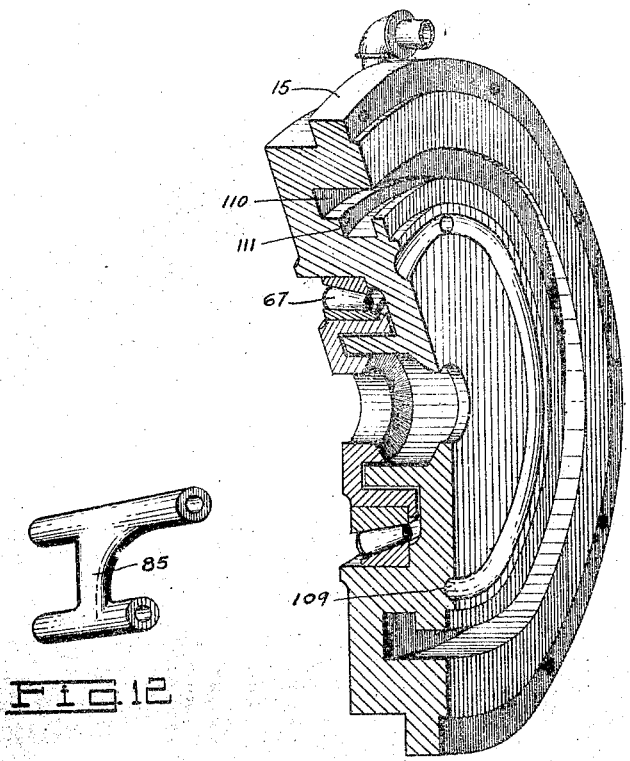
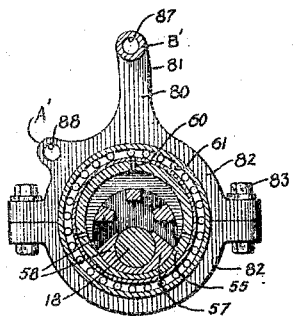
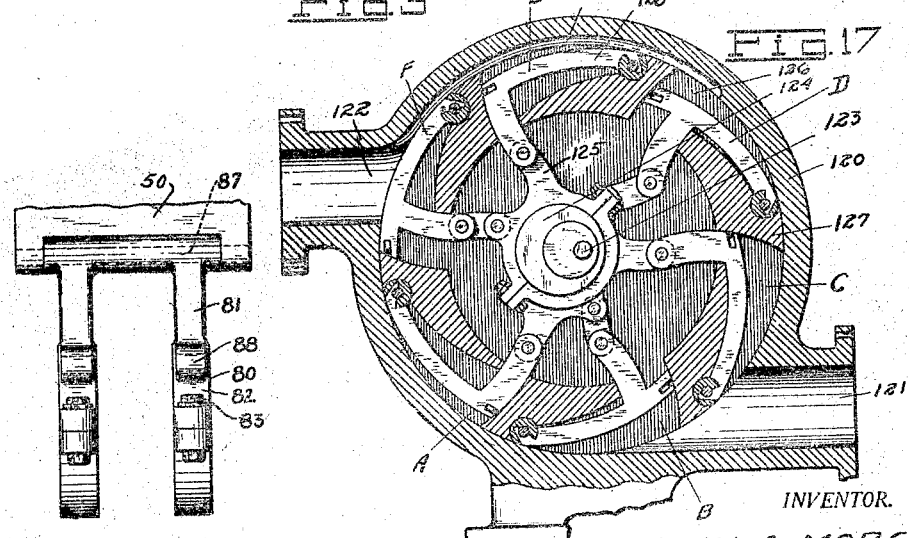
INVENTOR.
JOHN A. MORGAN
BY Craig
ATTORNEY.

Aug. 25, 1925.  
J. A. MORGAN  
1,550,835  
ROTARY ENGINE  
Filed Oct. 11, 1923   4 Sheets-Sheet 4

INVENTOR.  
JOHN A. MORGAN  
BY  
ATTORNEY.

Patented Aug. 25, 1925.

1,550,835

UNITED STATES PATENT OFFICE.

JOHN A. MORGAN, OF LOS ANGELES, CALIFORNIA.

ROTARY ENGINE.

Application filed October 11, 1923. Serial No. 667,935.

*To all whom it may concern:*

Be it known that I, JOHN A. MORGAN, a citizen of the United States, residing at Los Angeles, in the county of Los Angeles and State of California, have invented a certain new and useful Improvement in Rotary Engines, of which the following is a full, clear, and exact description, reference being had to the accompanying drawings.

This invention relates to rotary devices such as rotary engines, pumps, meters, and similar structures. In the following description, the device is described as a rotary engine although it is to be understood that the mechanism is equally well adapted for other uses.

The general object of the invention is to provide a rotary engine wherein the impeller members are radially movable and wherein the parts are associated in such a manner as to produce a highly efficient mechanism.

One of the specific objects of the invention is to provide a rotary engine having radially movable impellers together with means whereby the fluid operating the rotary engine may be caused to act upon both the inner and outer surface of the impellers.

A further object of the invention is to provide a rotary engine having radially movable impellers wherein an improved means for causing operation of the impellers is provided.

An additional object of the invention is to provide a rotary engine, having radially movable impellers, coacting with an eccentric, with improved means for connecting the impellers to the eccentric.

A further object of the invention is to provide an improved casing for a rotary engine wherein a part of the operating mechanism is incorporated in the body of the casing.

Another object of the invention is to provide a rotary engine, having radially movable impellers therein, with means for causing steam to coact with the outer surface of the impellers for a part of a revolution after which the steam acts upon the inner surface of the impellers for substantially the remainder of the revolution.

Figure 5:
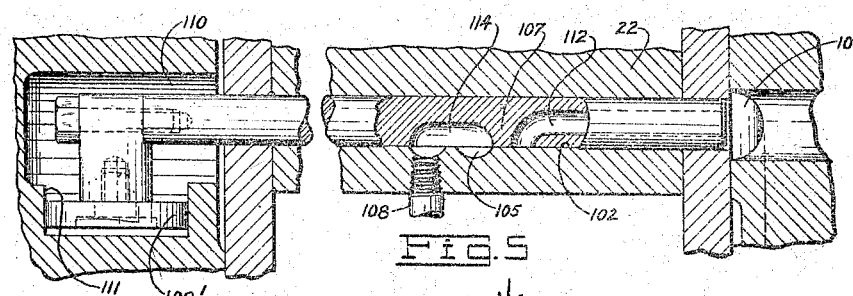
Figure 2:
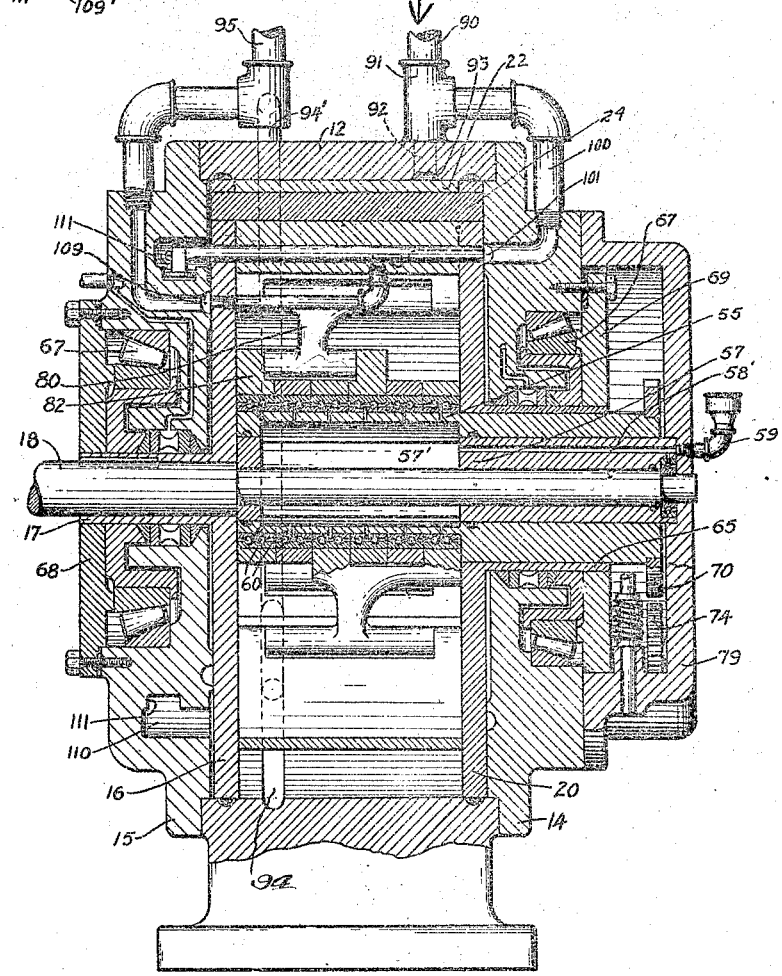
Figure 14:
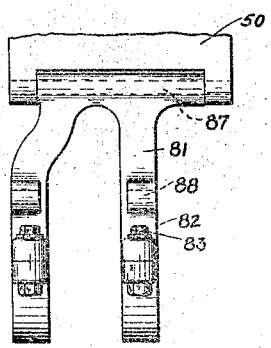
Figure 15:
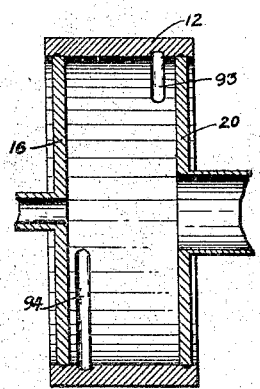
Figure 16:
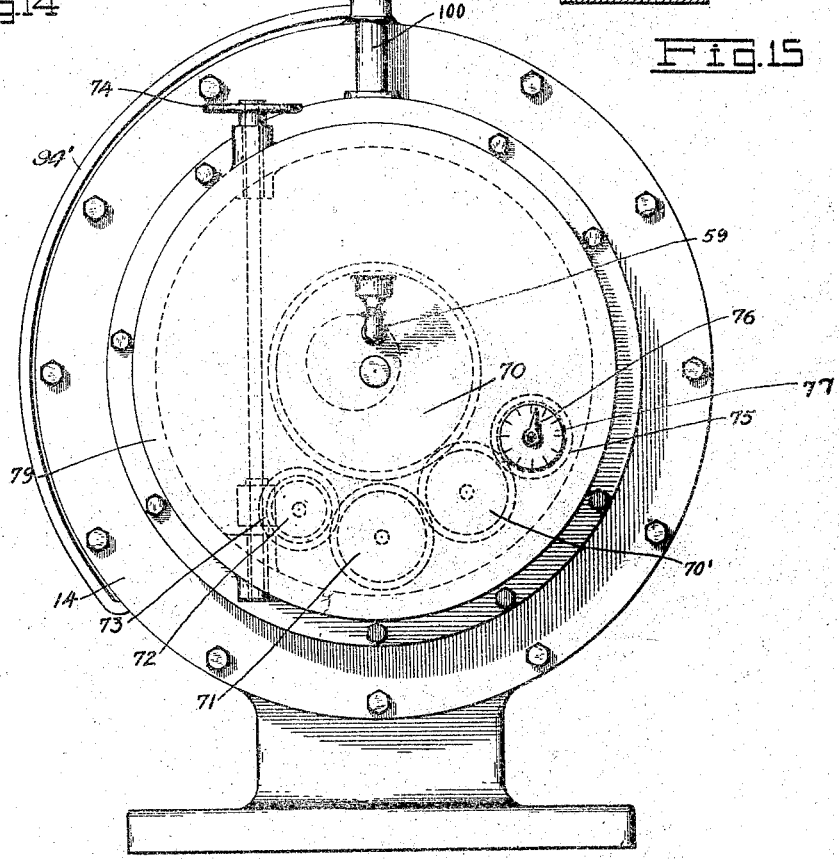

Other objects of the invention will be apparent from the following description taken in connection with the accompanying drawings wherein Fig. 1 is a cross section through a rotary engine embodying the features of my invention; Fig. 2 is a section on line 2—2, Fig. 1; Fig. 3 is a sectional perspective view of one end closure member; Fig. 4 is a sectional detail showing the eccentrics; Fig. 5 is a sectional detail showing the valve operating mechanism; Fig. 6 is a perspective view of one of the impellers; Fig. 7 is a view similar to Fig. 6 showing another impeller; Fig. 8 is a fragmentary section showing means for securing the impellers in position; Fig. 9 is a fragmentary elevation showing the packing means for the abutment; Fig. 10 is a view similar to Fig. 9 showing the packing means for the impellers; Fig. 11 is a perspective of one of the connecting links; Fig. 12 is a perspective of another connecting link; Fig. 13 is an elevation of one of the eccentric straps; Fig. 14 is an elevation of another eccentric strap; Fig. 15 is a horizontal central sectional view, on a reduced scale, of the casing, showing the steam ducts; Fig. 16 is an end view of the casing and Fig. 17 is a cross section showing a modified form of my invention.

As I have previously stated, my invention is applicable to rotary devices such as rotary engines, motors, pumps, meters, and similar structures, and although in the following specification, I emphasize the construction of rotary engines, I wish it to be understood that this is merely illustrative of one embodiment of the invention.

Referring now to the drawing, I have shown a casing at 10. This casing comprises a base portion 11 having a cylindrical portion 12 extending therefrom and adapted to receive the moving parts. Referring to Fig. 2 I show a pair of end plates 14 and 15 fitted to the cylindrical portion 12. Adjacent the end plate 15, I show a rotatable disc 16 having a tubular portion 17 thereon to which a power shaft 18 is keyed. A second rotatable disc 20 is provided adjacent the end plate 14. The two discs 16 and 20 are secured together and are adapted to be driven by mechanism to be later described.

Between the discs 16 and 20, I show a plurality of abutments 22 which are fixed to the discs to rotate therewith. The abutments are similar in construction, although of different dimensions.

The abutments are provided at one end with a substantially semi-cylindrical recess 23 in which I show a cylindrical pin 24. The pin 24 extends entirely through both of the rotating discs 16 and 20 and is provided with a notch 25 offset from one side of the center of the pin as shown in Fig. 1.

Mounted for angular movement upon each abutment 22, I show impellers 26. The impellers are adapted to move radially toward and from the casing, swinging about an axis which coincides with the axis of the pin 24. Each impeller is secured to the pin 24 by providing a tongue 27 thereon which is adapted to fit in the notch or recess 25 in the pin. The pin 24 and the tongue 27 are provided with an aperture 28 at each end thereof to receive a tapered locking member 29 which is preferably provided with a threaded head 30 shown as secured in the end of the pin 24.

The alternate impellers differ somewhat in shape although their function is the same and each impeller is mounted on an abutment in the described manner.

The outer surface 30' of each impeller has a curvature with a radius equal to the radius of the inner surface 31 of the cylinder 12. The portion 32 of each abutment adjacent the cylinder also has this same curvature. The inner surface of each impeller as at 35 may have the same curvature as the curvature of the inside of the casing but in any event it should correspond with the curvature of the outer face 36 of the abutments.

The outer ends 40 of the impellers 26 have a curvature corresponding to the curvature of the end of their companion abutment 40'. Suitable leak preventing means may be provided between the end of each impeller and the face of its coacting abutment. This may comprise a spring pressed fiber strip 41 as shown in Fig. 10. The face 42 of each abutment which engages the impeller is likewise provided with a spring pressed fiber insert 43 adapted to engage the rear face 44 of the impeller.

The construction is such that two fluid tight chambers are provided; one chamber being provided by an abutment, the outer surface of an impeller, and the inner wall of the casing, while the other chamber is between the inner surface of the impeller and the outer surface of the abutment.

Each of the impellers 26 is provided with a wing 50. As stated, the impellers 26 are of two kinds, one being shown at A, C, and E and the other at B, D, and F, Fig. 1. At A, C, and E the wing 50 is arranged some distance from the outer end of the impeller while at B, D, and F the wing is located adjacent the end of the impeller. In order to cause movement of the impellers 26 toward and from the casing, each of the wings 50 is connected with an eccentric member 55 which is arranged eccentric to the axis of the shaft 18.

The eccentric 55 is shown as a tubular member having ends apertured to receive a second eccentric 57 which is in turn eccentrically arranged upon a reduced portion of the shaft 18. By referring to Fig. 4 the arrangement of the two eccentrics will be noted. The eccentric 57 comprises a plurality of longitudinally extending portions 58 one of which is enlarged to receive the shaft 18. The eccentrics are hollow only in that portion thereof which is arranged between the rotating discs 16 and 20, while the remainder of the eccentrics is solid as shown in Fig. 2.

In the solid portion of the eccentric 57 I show a channel 58' which at one end communicates with the hollow portion 57' and at the other end communicates with a grease cup 59. Suitable apertures 60 extend through the wall of the eccentric 55 to lubricate the ball races 61 mounted upon the eccentric 55.

It will be noted that the disc 20 is provided with a tubular projection 65 similar to the tubular projection 17 on the disc 16. The discs 16 and 20 and their associated parts are mounted to rotate on bearings 67. The outer surface of these bearings is arranged in a recess in the end closure members 14 and 15 while the inner surface of the bearings engage the tubular portions 17 and 65 on the discs 16 and 20 respectively. The bearings 67 may be held in place by end closure plates 68 and 69.

In order to turn the eccentric 55 and thereby change the eccentricity of this eccentric 55 with respect to the axis of the shaft 18, I provide a gear 70 secured upon the solid end portion of the eccentric 55. The gear 70 may be operated through a train of gears 70', 71 and 72 and a worm gear 73 all shown in Fig. 16. The worm gear may be provided with a shaft operable by means of a hand wheel 74. The gear 70' is also shown in Fig. 16 as engaging a gear 75 which has an indicating arm 76 secured upon its shaft. A scale 77 may be provided to indicate the relative position of the eccentric. A suitable cap plate 79 may be provided as a cover for the gears and associated parts.

The adjustment of the eccentric 55 will alter the throw of the hinged impellers A, B, C, D, E, and F and will increase or decrease the stroke of these impellers. When full power is required, the full stroke of the impellers is used and when speed is more essential than power, the eccentric 55 will be rotated to bring about a shorter throw of the impellers.

In order to provide a connection between the wings 50 of the impellers 26 and the eccentric 55 I provide eccentric straps 80. There are three of these eccentric straps used in the machine illustrated, each strap serving to connect two impellers with the eccentric. The three straps are similar in construction. Each comprises a connecting portion 81 (see Fig. 4) from which a pair of straps or bands 82 extend. The bands 82 are spaced apart as shown in Figs. 2, 13, and 14 and the parts of each band may be secured together by bolts 83.

By referring to Fig. 2 it will be noted that the eccentric strap 80 shown at the top of this figure has the bands 82 thereof spaced apart on the eccentric 55 to receive therebetween the bands of the other two eccentric straps.

The band shown in detail in Fig. 13 is the one which is located in the center of the eccentric. The band shown in Fig. 14 is the one located at one end of the eccentric while the one located at the other end of the eccentric is reversal of the one shown in Fig. 13. This arrangement provides a good distribution of forces along the eccentric 55.

Each of the individual eccentric straps 81 is provided with a pair of coupling apertures 87 and 88 for securing it to the impeller wings. Referring to Fig. 4 the projection A' having the aperture 88 is adapted to be connected to the impeller A, while the projection B' having the aperture 87 is adapted to be connected to the impeller B. In connecting the impellers the portions A' of the straps 80 and impellers A, C, and E are connected by means of links 85 of the character shown in Figs. 11 and 12 while projections B' and the impellers B, D, and F are directly connected.

It will be noted that every other impeller is fastened directly to the eccentric band while the intermediate impellers are connected to this band through a link which is attached a short distance from the end of the impeller. This arrangement is necessary in order to provide a correct throw for the impeller and to provide proper clearance.

From the foregoing description it will be apparent that when the impellers A and B are pushed in they react against the eccentric 55 and rotate about this eccentric, carrying with them rings 16 and 20 and thereby turning the shaft 18. The impeller C in the position shown in Fig. 1 has just reached the point of extreme inward movement and is ready to move outwardly. The impeller D is in a position to move outwardly if pressure is applied against the inner face thereof. The impeller E at this time acts similar to the impeller D while the impeller F has just reached its extreme outer position and is ready for its inner movement.

From the foregoing description, it will be apparent that if steam pressure is applied to the outer surfaces of the pistons F, A, and B, and to the inner surfaces of the pistons C, D, and E, that these pistons will reciprocate and rotate carrying with them the shaft 18.

I will now proceed to describe the means for bringing steam into action against the pistons. Referring to Fig. 2 I here show a steam supply pipe 90 which is provided with a T 91 from which a conduit 92 extends to an inner peripheral groove 93 formed upon the inner surface of the tubular member 12.

By referring to Fig. 1 it will be noted that the groove 93 is uninterrupted from one end to the other so that the steam may act constantly upon the impellers when they are at F, A, and B. The groove 94 as shown in Figs. 2 and 15 serves as an exhaust. This exhaust begins at a point spaced from the end of the high pressure groove 93, so that the steam acting upon the impeller C is not live steam but is steam that has just expanded to gain full efficiency. From the groove 94 the exhaust steam passes through a pipe 94' to a pipe 95 in the top of the casing 12.

From the preceding description it will be seen that when the parts are in the relation shown in Fig. 1 the steam is just beginning to act upon the outer surface of the impeller F, that the impeller A has been forced inwardly a short distance, that the impeller B is approaching the inward limit of its movement, and that the impeller C is at its inner limit of movement and is ready to move outwardly.

In order to provide steam pressure upon the inner face of the impellers 26 during the time these impellers are moving outwardly I show a line 100 leading from the T 91. This line 100 communicates with a circular groove 101 arranged in the inner face of the plate 14. Each of the abutments 22 (see Fig. 5) is shown as provided with a passageway 102 which communicates at one end with the groove 101 and which communicates intermediate its length with a conduit 105 shown as extending through each abutment 22 and terminating in the cavity formed behind each impeller 26.

A valve member 107 controls the flow of the steam from the groove 101. An exhaust line for the cavity adjacent each abutment is shown at 108. This exhaust line communicates at one end with a peripheral groove 109 formed in the plate 15 and at the other end communicates with the valve passageway 102. The valve 107 is provided with an operating cam 109' which is shown fitted in a recess 110 having a cam groove 111 and arranged in the cover plate 15. The cam groove is arranged to reciprocate the valve 107.

The valve member 107 is provided with a channel 112 which communicates at one end with the groove 101. When the valve is in the position shown in Fig. 5 where the valve member 107 is at the right, the conduit 105 in the abutment 22 is in communication with the exhaust line 108 due to the cavity 114 in the valve member 107. When the valve member 107 moves to the left from the position in Fig. 5 communication between the conduit 105 and the exhaust 108 is cut off, and the conduit 105 is, through the channel 112, placed in communication with the steam groove 101.

As shown in Fig. 1 the conduit 105 in the abutments for the pistons A, B, and C, is in communication with the exhaust line 108, while the conduits 105 of the abutments, associated with pistons D, E, and F, are open to the steam line. Consequently steam is being exhausted from behind pistons A, B, and C and is being supplied behind pistons D, E, and F.

In Fig. 17 I have illustrated my invention as embodied in a simple type of pump. The pump comprises the casing 120 having inlet 121 and outlet 122. The drive shaft is shown at 123 and on this drive shaft I show a shiftable eccentric 124 having eccentric straps 125 mounted thereon. A pair of discs 126 are secured to the drive shaft and upon these discs abutments 127 are mounted.

Upon the abutments 127 I arrange impellers 128 which are connected with the eccentric straps 125. All of the parts described in connection with this modification have been previously described and a further description is deemed unnecessary.

A discharge channel 130 is arranged in the casing 120. In the operation of the pump, as the discs 126 are rotated anti-clockwise a partial vacuum is created in the chamber A. The water enters the chamber B and also the chamber C. The discharge channel 130 is so arranged that at the beginning of the outward movement of the impeller D the cavity of this impeller communicates with the discharge channel 130 to discharge the water. The impeller E has discharged a large part of the water from its cavity and the impeller G is at the approximate outer limit of its movement. The pump is adapted to be provided with an eccentric shift similar to that previously described.

Having thus described my invention, I claim:

1. A rotary device including a casing having a rotatable member therein, a plurality of fixed abutments secured to said rotatable member, radially movable impellers carried by said member, a high pressure steam groove in said casing communicating with said impellers to force said impellers inwardly when they are in one position, a second high pressure steam line communicating with said impellers when in another position to force them outwardly and an exhaust line leading from said impellers.

2. In a rotary engine, a casing, a rotary member within the casing having a plurality of abutments affixed thereon and rotatable therewith, a plurality of impellers, one associated with each of said abutments, means to lead high pressure steam to the outer face of said impellers during a partial rotation of the rotary member, means to lead high pressure steam to the back of said impellers during the remainder of the rotation and means to thereafter exhaust the steam to the atmosphere.

3. In a rotary engine, a cylindrical casing, a drive shaft, a pair of spaced plates secured to said drive shaft to rotate therewith, a plurality of spaced abutments mounted on said plates, an impeller mounted on each abutment, an eccentric mounted eccentric to the axis of said shaft, connections between said impellers and said eccentric, means for applying steam pressure to one side of each impeller when in a certain position, and means for applying steam pressure to the reverse side of said impellers when in another position.

4. In a rotary engine, a cylindrical casing having a rotary mechanism therein, said mechanism including pivoted impellers movable toward and from the wall of said casing, means whereby said movement of the impellers causes the rotary mechanism to revolve, means to conduct steam during a part of a revolution against the outer surface of said impellers whereby they will move inwardly and means to conduct steam against the other side of said impellers when in another position.

5. In a rotary mechanism, a casing, a plurality of rotating discs therein, impellers mounted upon said discs for radial movement, means to conduct steam to one side of the impellers during a part of the rotation thereof, means to conduct steam to the other side of the impellers during another part of the rotation thereof and means to control the flow of steam to the impellers during the last mentioned operation, said last mentioned means being controlled by the rotation of the disc.

6. A rotary device including a casing having a rotatable member therein, a plurality of fixed abutments secured to said rotatable member, radially movable impellers carried by said member, a high pressure steam groove in said casing communicating directly with said impellers when in one position to force said impellers inwardly, a second high pressure steam line communicating with said impellers when in another position to force them outwardly, and a valve mounted in said abutment for controlling said second mentioned high pressure steam line.

7. In a rotary engine, a cylindrical casing, a drive shaft, a pair of spaced rotatable discs secured to said drive shaft to rotate therewith, a plurality of spaced abutments secured to said discs, an impeller mounted on each abutment, an eccentric mounted eccentric to the axis of said shaft, connections between said impellers and said eccentric, and means for applying steam pressure against the inside of each impeller during a part of the revolution of the discs.

8. In a rotary mechanism, a casing, a pair of discs mounted to rotate in the casing, a plurality of impellers mounted for radial movement on the discs, means to conduct steam to one face of the impellers, a valve controlling said conducting means, said valve including a member movable transversely between the rotating discs, an exhaust line from said impellers, said valve in one position being arranged to direct high pressure steam to the impellers and the said valve in another position being arranged to connect the impeller with the exhaust line.

9. In a pump, a casing, a rotary member within the casing, having impellers thereon, movable toward and from the casing, said casing having end closures, an eccentric within the casing, a connecting link between each impeller and said eccentric, a reservoir for lubricant associated with said eccentric, means whereby said eccentric may be lubricated from said reservoir and means to cause steam to act successively first upon the outer wall of the impeller and then upon the inner wall thereof.

10. In a rotary mechanism, a casing comprising a body part having a cylindrical inner portion, end closure plates at each end of said cylindrical portion, a steam conduit in the inner surface of said cylindrical portion, a high pressure steam duct in the inner face of one of said end plates, means to conduct steam to said conduit and said duct, an exhaust steam duct in the inner surface of the other closure plate, a rotary device mounted between said closure plates and means on said rotary device adapted to be driven by steam passing through said conduit and said first mentioned steam duct.

11. In a rotary engine, a casing, a rotary member, a plurality of impellers mounted upon the rotary member for movement toward and from the casing, means whereby radial movement of the impellers causes the rotary member to revolve, means to direct steam against the impellers to move the impellers away from the casing and other means for causing steam to move the impellers toward the casing, said first mentioned means comprising an internal groove in the inner cylindrical wall of the casing, said casing having an end closure cap, and said other means including a circular groove in the end closure cap.

12. In a rotary engine, a casing, two rotating discs mounted within the casing, a shaft secured to said discs, abutments fixed to said discs and spaced in circular arrangement within the casing, impellers between said discs, each of said impellers being pivoted at one end to an abutment and having a moving fit at the other end with an adjacent abutment during the complete revolution of the abutments, and means to cause steam to act on the outer surface of a plurality of the impellers while said impellers are in a certain portion of the casing and additional means to cause steam to act upon the other side of said impellers when they are in another position.

13. In a rotary mechanism, a cylindrical casing, a pair of discs mounted to rotate in said casing, a drive shaft secured to said discs, a plurality of abutments secured to said discs, an impeller associated with each abutment, an eccentric on said shaft, a connection between said eccentric and each impeller, each impeller and an abutment forming a chamber which is defined by an inner portion of an impeller and an outer portion of an abutment, and means to conduct steam to said chamber, said means including a steam duct in the casing and a channel extending from said steam duct to said cavity and a valve for controlling the passage of steam from said duct to said cavity.

14. A rotary device including a casing and a rotatable disc, radially movable impellers carried by said disc, a drive shaft, a member mounted eccentric to said drive shaft, an eccentric adjustably mounted on said member, a plurality of abutments secured to said disc, a plurality of impellers pivotally mounted on said abutments, said casing, said abutments, and said impellers coacting to form a pair of chambers, one on the outside of said impeller and the other on the inside of said impeller, and means acting during the rotation of said disc to first cause steam to be directed against the outside of said impeller and then to be directed against the inside thereof.

15. In a rotary engine, a casing, two rotating discs mounted within the casing, a shaft secured to said discs, abutments fixed to said discs and spaced in circular arrangement within the casing, impellers between said discs and abutments, each of said impellers being pivoted at one end to an abutment and having a moving fit at the other end with an adjacent abutment during the complete revolution of the abutment, said impellers and abutments being arranged in diametrically opposite pairs, and means whereby steam acts upon the outside of one impeller to force the same inwardly and acts upon the inner surface of the diametrically opposite impeller to force this impeller outwardly, simultaneously.

16. In a rotary engine, a cylindrical casing, a pair of discs mounted to rotate in said casing, a drive shaft secured to said discs, a plurality of abutments secured to said discs, an impeller associated with each abutment, an eccentric on said shaft, a connection between said eccentric and each impeller, each impeller and an abutment forming a chamber which is defined by an inner portion of an impeller and an outer portion of an abutment, means to conduct steam to said chamber, said means including a steam duct in the casing and a channel extending from said steam duct to said cavity, a valve for controlling the passageway of steam from said duct to said chamber, and means mounted on said casing for operating said valve.

17. A rotary device including a casing, a pair of rotating discs in the casing having a plurality of fixed abutments thereon and having a plurality of impellers each pivotally mounted upon an abutment to move radially, a shaft secured to said discs, an eccentric mounted eccentric to the axis of said shaft, means to connect said eccentric and said impellers, said means comprising a plurality of links, each of said links comprising spaced straps surrounding the eccentric and having two connecting portions thereon, one of said connecting portions being directly connected with an impeller and the other connecting portion being connected to a link, said link being connected to an impeller.

18. In a rotary mechanism, a cylindrical casing, a pair of discs mounted to rotate within said casing, a shaft secured to said discs, an eccentric member mounted upon said shaft, a plurality of pairs of abutments secured to said discs, one of said abutments being longer than the other, a plurality of impellers, one mounted on each of said abutments and having connections with said eccentric whereby they move radially when the discs rotate, one of said impellers comprising a member pivoted to an abutment at one end and engaging another abutment at the other end and having a wing spaced from both ends and secured to said eccentric and another impeller, pivoted to an abutment and coacting with another abutment and having a wing at its end coacting with said eccentric.

19. In a rotary engine, a casing, two rotating discs mounted within the casing, a shaft secured to said discs, an eccentric mounted in said shaft, means to shift said eccentric, abutments fixed to said discs and spaced in circular arrangement within the casing, impellers between said discs, each of said impellers being pivoted at one end to an abutment and having a moving fit at the other end with an adjacent abutment during the complete revolution of the abutment, means connecting each impeller to the eccentric, said impellers and abutments being arranged in diametrically opposite pairs and means whereby steam acts upon the outside of one impeller to force the same inwardly and acts upon the inner surface of the diametrically opposite impeller to force this impeller outwardly, simultaneously.

20. In a rotary engine, a casing, two rotating discs mounted within the casing, a shaft secured to said discs, an eccentric on said shaft, means to shift said eccentric, abutments fixed to said discs and spaced in circular arrangement within the casing, impellers between said discs, each of said impellers being pivoted at one end to an abutment and having a moving fit at the other end with an adjacent abutment, means connecting each impeller with the eccentric and means to cause steam to act on the outer surface of a plurality of the impellers simultaneously while said impellers are in one position and additional means to cause steam to act upon the other side of said impellers when they are in another position.

21. In a rotary mechanism, a cylindrical casing, a pair of discs mounted to rotate in said casing, a drive shaft secured to said discs, a plurality of abutments secured to said discs, an impeller associated with each abutment, an eccentric on said shaft, a connection between said eccentric and each impeller, each impeller and an abutment forming a chamber which is defined by an inner portion of an eccentric and an outer portion of an abutment, means to conduct steam to said chamber, said means including a steam duct in the casing and a channel extending from said steam duct to said cavity, a valve for controlling the passageway of steam from said duct to said cavity, an end plate on said casing, a cam groove on said end plate, said valve having a cam member coacting with said cam groove whereby the passageway of steam to the cavity is controlled and means whereby when said discs are in a certain angular position high pressure steam will be admitted to said cavity to force the impellers outwardly, an exhaust line and other means whereby when said discs are in another angular position the cavity will be open to the exhaust line.

In testimony whereof, I hereunto affix my signature.

JOHN A. MORGAN.